United States Patent [19]

Dolch

[11] 3,847,346

[45] Nov. 12, 1974

[54] DATA FIELD RECOGNITION AND READING METHOD AND SYSTEM

[75] Inventor: Volker Dolch, Neu Isenburg, Germany

[73] Assignee: Scanner, Inc., Houston, Tex.

[22] Filed: Jan. 21, 1974

[21] Appl. No.: 435,358

Related U.S. Application Data

[63] Continuation of Ser. No. 284,733, Aug. 30, 1972, abandoned.

[52] U.S. Cl. .................... 235/61.11 E, 340/146.3 D
[51] Int. Cl. .............................................. G06k 7/00
[58] Field of Search....... 340/146.3; 178/6.8, 5.4 M; 235/61.11 E, 61.11 F, 61.11 G, 61.11 H; 250/219 D, 219 DR, 219 DP

[56] References Cited

UNITED STATES PATENTS

| | | | |
|---|---|---|---|
| 3,693,154 | 9/1972 | Kubo et al. | 340/146.3 H |
| 3,713,099 | 1/1973 | Hemstreet | 340/146.3 C |

*Primary Examiner*—Thomas A. Robinson
*Attorney, Agent, or Firm*—Ralf H. Siegemund

[57] ABSTRACT

Objects are identified by means of data information and may appear in random position and orientation and at random times in a particular area; a data field is provided to a surface of the objects in particular orientation having contrasting data markings arranged in at least one track, and a contrasting line pattern identifies location and orientation of the data field, the lines of the pattern extend in a first direction, the thickness and/or spacing of the lines is asymmetric in a direction normal to the first direction; the particular area is line-for-line scanned for repeatedly detecting a particular signal pattern resulting from scanning across the line pattern in a data field, the data field position and orientation is determined upon repeatedly detecting the particular signal pattern, and a unique data field scanning pattern is provided on the basis of the position and orientation determination, for causing the data track to be scanned repeatedly in direction of its extension and for reading the data contained therein.

32 Claims, 8 Drawing Figures

DATA FIELD RECOGNITION AND READING METHOD AND SYSTEM

This is a continuation of application Ser. No. 284,733, filed Aug. 30, 1972, abandoned.

BACKGROUND OF THE INVENTION

The present invention relates to method and apparatus for identifying objects which may, at times, appear in a particular location and whenever the need for identification arises. More particularly, the invention relates to method and apparatus for preparing objects for quantitative identification and for providing for acquisition of such identification.

Objects such as items of merchandise, warehoused components or the like have to be identified at times in machine-readable form. For this, machine-readable code patterns are affixed or otherwise applied to these objects whereby the code pattern identifies the object to the extent needed. Such identification may include one or more data items such as part number, quality codes, dimensional identification, relevant dates, price, number of content (e.g., items in a box), etc. This identifying data is in one form or another placed on the surface of the objects.

Acquisition of such data is rarely possible under complete exclusion of disturbing influences. Rather, in the general case, the objects differ in size, dimension and, most importantly, the identifying data is not affixed in any specific position upon said object. The acquisition process cannot be carried out under the assumption that the data be presented in a definite location, with definite orientation and at specified times. In other words, the contemplated acquisition process is not similar to, example, punched card reading, where a card is placed in a well-defined reading position with edges abutting guide rails, etc., and where the completion of placement is well-defined in time. Quite the opposite is true for the general case of data acquisition presently considered. The object identifying data are contained in a field which may have been placed somewhere on an object; the object itself may appear only more or less approximately in a definite location, which for practical purposes is a random location even though there may be practical confines. Also, the angular orientation of the data field must be regarded as being at random, so must be the time of appearance.

Take the situation of an automated supermarket checkout facility, the identifying information being prince. The objects are the various items of merchandise such as boxes of numerous shapes and sizes, bottles, packages, etc. These items appear one after the other in a check-out counter wherein the prices have to be read and tallied. The one constraint that can reasonably be made, is that the respective surface of any item bearing the identifying information must face always in one particular direction, for example, up or down, or sideways. Consistency can readily be observed as to this point. It is impossible, however, to require that orientation and location of data fields, bearing the price information, be predetermined through precision positioning of the items. Moreover, labels holding the data fields must be expected to have been affixed to the different items in varying orientation. Also, the items will not pass through the check-out counter in regularly spaced apart relation, nor will they appear in regular sequence under a reading station.

Therefore, the reading station must be in continuous preparedness for reading data, must "look" for the data and must read them in proper orientation.

DESCRIPTION OF THE INVENTION

It is an object of the present invention to provide for the acquisition of identifying information and data that may appear at random times in random location and orientation within a specified area.

In accordance with the preferred embodiment of the present invention, it is suggested to provide the identifying information in a data field in one or several data tracks along which data markings are arranged. The location and orientation of the data field and its track or tracks are identified by the position of a position-identifying character, or PIC for short. The character is to have linear extension, so as to exhibit a uniform contrast pattern in a first direction but a particularly variable contrast in the orthogonal direction. Preferably, the contrast pattern in this orthogonal direction is asymmetric, the asymmetry being indicative of direction orientation of the data. Asymmetry may be established through different line thicknesses and/or different line spacing in the said orthogonal direction.

Upon scanning the data field and passing transversely across the pattern at not too shallow an angle to the lines of the pattern, a unique and, therefore recognizable pattern will be detected. Upon repeating the line scan in an offset scanning line (analogous to a field scan) the detection will be verified, and the direction of extension of the line pattern; i.e., the said first direction of extension of the PIC and data field is ascertained. On basis of the direction information and, possibly, of the detected orientation as to the symmetry of the line pattern, the location, beginning or end, and the angular orientation of the data field is ascertained. The data field is read on basis of that information by means of a unique line raster scan generated just for reading the data field in its random position and/or orientation.

Basically, three cases are to be distinguished; however, the first one is presently deemed preferable over the second one, while the third case has its own unique merits. The cases differ in the orientation of the position identifying character (PIC) relative to the data in the data field. The PIC is preferably a contrasting line pattern of variable line thickness and/or spacing and running lengthwise, i.e., parallel to the data track. In the data field search mode, a line-field scan raster looks continuously for such character in a search and inspection field. The scanning raster is rotated in steps. The PIC is recognized if and when a plurality of consecutive scanning lines have passed transversely across the PIC lines, and if the asymmetric pattern has been read repeatedly successfully during the scan and has been decoded as such.

In the second case, the PIC lines have also variable thickness and/or spacing but they extend orthogonal to the data tracks, at the beginning or end thereof. The first case is preferred, as the longer PIC lines permit more frequent repetition (higher redundancy) of scanning across the lines, so that the possibility of incorrect identification is reduced. Also, raster rotation in finer steps may be advisable in the second case to a ascertain the direction of data field and track extension with sufficient accuracy so that this method takes longer time. The second case has, however, the advantage of a smaller data field or label area that is occupied by the PIC information; that is the favorable side for a trade off of the higher probability of incorrectly locating a data field on basis of an accidentally similar contrast pattern in the search and inspection field. The third case combines both types of PIC's and obviates the need for raster rotation. It is advisable in all cases to have a so-called start/alignment character, e.g., at the beginning of a data field. Among other points such start/alignment character permits accurate timing of processing read signals unambiguously as data signals. This character can readily combine the start/alignment function with the function of a second PIC. If there are several data tracks it is indeed advisable to combine the start alignment function with the PIC function in one unique line pattern at one end of the data proper in the multi track field.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a block diagram showing the base layout of the system;

FIG. 2 is a representative example of a data label to be standard for and read, in and by the system shown in FIG. 1;

FIG. 3 is a circuit diagram to be used for obtaining scanning raster field rotation;

FIG. 4*a* and 4*b* diagrams showing labels and search scan to two different orientations;

FIG. 5 is a block diagram of a portion of a subsystem of FIG. 1, showing bare features for the data field detection and set up for data field reading;

FIG. 6 is a diagram view similar to FIG. 2, 4*a* and 4*b* showing points and distances relevant for the oriented read scan process carried out by the circuit of FIGS. 1 and 5; and FIGS. 7 and 8 show data fields with two different position identification characters.

DESCRIPTION OF THE DRAWINGS

Proceeding now to the detailed description of the drawings, in FIG. 1 thereof the overall layout of a system is illustrated and constructed in order to practice the preferred embodiment of the present invention. It is assumed that a label such as 10 may appear within an inspection or search field 11 at random times, in random position and in random orientation, except that the level and the tilting angle of that field 11 in relation to the (possibly differing) levels of different labels 10 should not vary overy wide ranges.

It can be assumed that the label 10 is affixed to a container, package or to any item of merchanidise and bears identifying information of the type representatively illustrated in FIG. 2. Such items of merchandise may be placed into the inspection field 11, for example, manually at random times as stated, or they may pass through the inspection field by operation of a conveyor belt or the like. The inspection field per se is defined by the optical aperture of equipment such as a flying spot scanner 12 (or a vidicon) which scans the area 11 through a scanning raster to be explained in greater detail below.

Figure 1:
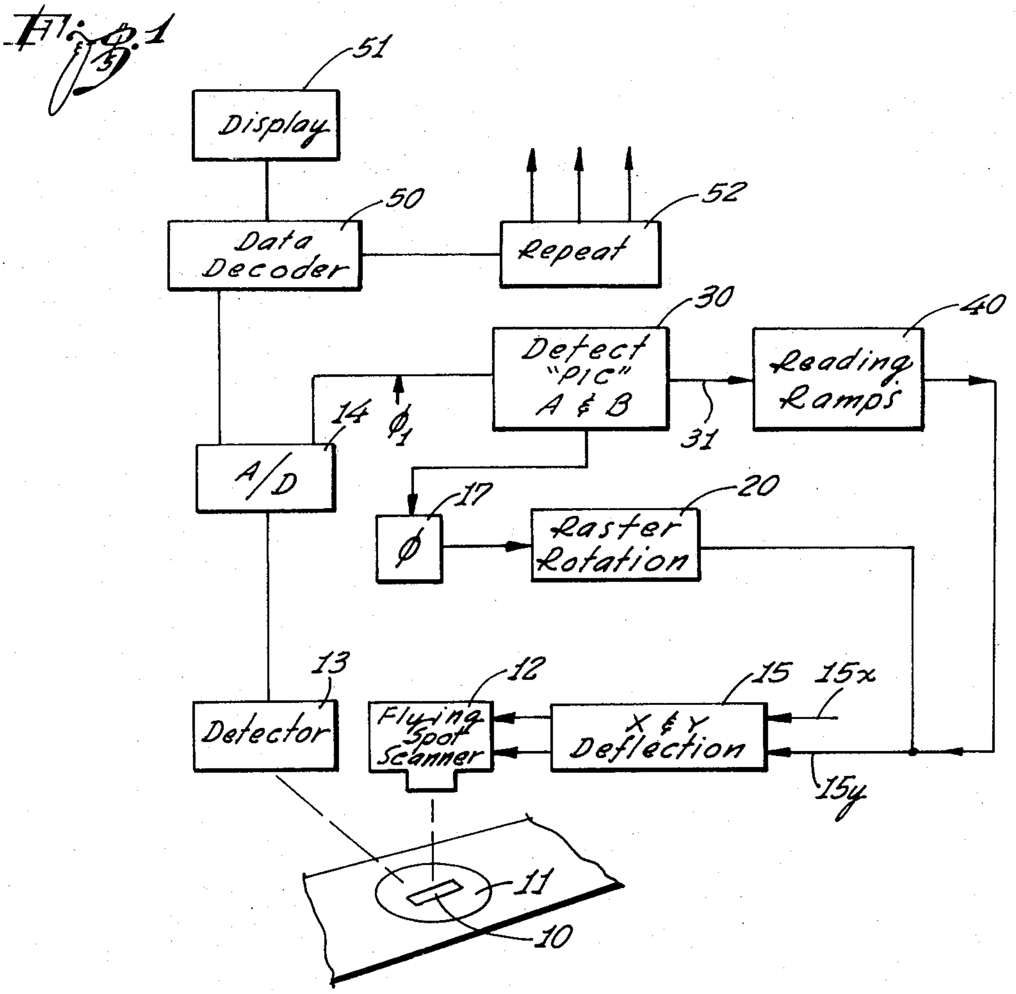

A photoelectric detector 13 observes the reflection of the scanning spot as provided by the flying spot scanner 12, and detector 13 provides a linear electrical signal whose amplitude varies with the progression of the scanning spot across differently reflecting portions of the scanning field 11. The electrical output signal of detector 13 is pre-processed, or it can be said that this output signal is digitized; signals below a particular level are regarded as "black" and detection signals above the level are regarded as "white".

Therefore, the signal as processed in circuit 14, leaves the circuit 14 as a train of pulses of variable duration, and the pauses in between have also different lengths corresponding to a, usually, random distribution of reflecting and absorbing surface areas of objects in the search field 11. The signal level varies essentially in-between two amplitudes only, even though the search field covered contains a wide range of conrast intensities, objects of different absorption and color, etc.

It is now the object of the equipment to be described to read the data contained in a label such as 10. Reading must be preceded by ascertaining information concerning the location and orientation of the data field, so that the read process can be organized commensurate with the position of a label 10 in field 11. Detection of the particular position and orientation of the data field on the label must precede the read process.

Figure 2:
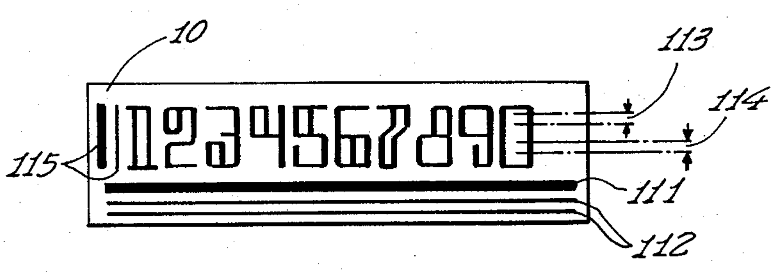

Before proceeding further with the description of the general system layout in accordance with FIG. 1, we turn to FIG. 2 illustrating an example of such a label. The label is defined as a rectangular data field, in the lower portion (it could be the upper portion) of the label is provided a linear PIC in form of a line or bar pattern that spans essentially the entire length of the data field. This bar pattern identifies location and orientation of the data field.

The particular pattern illustrated was found to fulfill this function adequately. The longitudinal extension of the pattern defines the direction of the tracks on label 10. The asymmetry of the bar pattern defines the orientation of the data field as to beginning and end of the tracks. As stated above, the asymmetry of the pattern in the direction orthogonal to the extension of the lines results from choosing lines or bars of variable thickness and/or by spacing these lines differently.

The bar pattern assumed here representatively and practiced in reality as advantageous, is comprised of a relatively thick bar 111 underneath of which are placed two equidistantly spaced bars 112 which are thinner than bar 111. As will be shown in greater detail below, the data acquisition equipment has as one of its functions the detection of location and orientation of such a PIC pattern.

Having found the bar pattern, location and angular orientation of the data field are defined therewith, simply because the thin bars are, by definition, under the thick bar 111, whereas the data themselves are located above bar 111, and that defines the orientation of the data field as to beginning and end.

The data field is represented by characters plotted by way of example in the data field, and it can readily be seen that the characters are legible by humans with comparatively little effort. Each character is defined in the following manner. There are six bit positions available for each character; three in an upper track 113 and three in a lower track 114 as extending along the PIC lines 111 and 112. Each character has our thin bars which extend transversely to the tracks, and they are particularly distributed in the six bit positions; the distribution is unique for each character (four-out-of-six-code). These thin bars are thin vertical lines in the data field as illustrated. The arrows adjacent to reference numerals 113 and 114, respectively, denote the width of the two tracks. The gap between the tracks as well as label space above and below the tracks is used to place additional contrasting line segments in the characters to enhance legibility. Thus, the several connecting lines, extending essentially parallel to the data tracks, serve no purpose as far as coding is concerned, but they render the individual characters legible.

Finally, the data field contains a so-called start/alignment character 115 comprised, for example, of a thick vertical bar followed by a thin bar. This start/alignment character is redundant as far as defining the orientation of the data in the data field is concerned. The start-/alignment character is, however, used to define exactly the vertical extension of the data field during data reading.

It should be mentioned that the label as such, particularly as far as printing the PIC is concerned, is initially prepared, whereas for each individual label the data content is printed individually as it is that particular content which identifies the item to which the label is or will be affixed. The start/alignment character is printed on the label as the first character. That printing process may undergo certain variations in the disposition of the characters above bar 111 so that the vertical extension of the start/alignment character 115 defines that possible misalignment.

The start/alignment character may also serve another purpose: Upon setting up the scanning field for data reading, the scanning spot should retrace to some point to the left of that start/alignment character. Each read scanning line is then decoded for detecting the character, and information preceding the decoding is disregarded. Therefore, the retrace need not be very accurate as to location of arrival of the scanning spot to the left of that character.

The data characters are approximately, for example, 6 mm high. The bar 111 may, for example, be 1.2 mm thick; the bars 112 may be each 0.4 mm thick, and the spacing in between may be 0.6 mm. It is additionally required that at least half a millimeter white space remains above line 111 and below the lower one of the line 112. After this description of the data field and of the relevant information it contains, I return to the description of FIG. 1.

As stated, it is the object of the equipment to read the data in a data field through a scanning process that extends parallel to PIC and to the data tracks which is the same as saying that the data read process requires data field scanning parallel to the line 111, and at a particular distance therefrom. Before, however, the data read process can take place, it is necessary to find the location of the data field and its orientation. And before that, of course, it must be found out whether there is any data field in the search field 11 at all.

The equipment includes an XY deflection system 15 for the flying spot scanner 12. X and Y define here the two different directions of scanning spot deflection through the appropriate coil or capacitive deflection system of the flying spot scanner 12. The search field 11 is normally under continuous surveillance by means of a scanning raster that rotates. A normal scanning raster is established in that, for example, a line scan signal of relatively high frequency and of sawtooth configuration is applied to the input 15 X for the deflection system that causes the flying spot to deflect in the X direction; whereas a sawtooth signal of lower frequency is applied to the analogous input 15 Y for the subsystem in 15 that deflects the scanning beam in the Y direction. The Y scan, therefore, can also be described as the field scan because as a consequence of the lower frequency of the Y scan, sequential scanning lines in the X direction are offset transverse to the X direction, thereby covering the entire scanning field, line-for-line.

By modifying the signals as they are applied to the X and Y deflection subsystems in 15, in a similar scanning pattern can be created but at at angle in relation to the X and Y directions or axes as defined in the tube. Reference numeral 20 denotes a control circuit for the X and Y deflection system 15 which causes a generation of an obliquely positioned scanning field. Morever, by changing the directions, the scanning raster can be regarded as being or as having been rotated.

For example, the search field 11 is first scanned in one particular orientation with X defining the direction. of line scan and Y the direction of field scan. Upon completion of one field scan cycle, the fast and slow speed ramp generators in circuit 20 provide particularly summed inputs to both channels 15X and 15Y to that a field scan occurs again, but now the lines have a particular angle to the direction X. Upon varying the summing conditions on the channels 15X and 15Y, field scans are obtained in different directions.

The particular circuit 20 is designed to vary the angle of orientation of the scanning field, and from field scan to field scan, for example, by 30° or 60°. The purpose of this variation is to orient the scanning field so that in some instances the scanning beam or scanning spot traverses the data field and passes across the PIC at not too shallow an angle, and the bar or line pattern arrangement of the PIC can then be recognized by such transverse scanning.

The angle in between sequential line raster scans is determined by the maximum permissible angular deviation from 90°a scanning line may have when running across the PIC, while the PIC-pattern can still be recognized. Otherwise the choice of the angular steps for this raster rotation is arbitrary, and the certainty in the detection increases if the angular steps are not too large. Nevertheless, too small a number of steps as far as raster rotation is concerned, prolongs the time of detecting the presence of a data field, and of a PIC in particular in the search field 11. Such a delay is undesirable. It was found that a 60° angle for the stepwise rotation of the raster field is sufficient for the particular PIC selected as shown in FIG. 2.

In the normal search operation, therefore, the raster rotation control 20 causes the X and Y deflection system 15 to change orientation of the raster scan, and provides a line raster scanning field which is being rotated in steps on a continuing basis until a PIC is recognized. Circuit 20 is particularized in FIG. 3.

The detector 13 provides continuously output signals pursuant to that scanning operation. During this first phase of operation as determined by a phase counter 17, the detector output signal is processed in the contrast-and-threshold circuit 14 and passed continuously to a PIC detector 30. The PIC detector will be explained in detail with reference to FIG. 5.

As symbolically indicated by line 31, a circuit 40 is enabled after the presence of a PIC has been detected and after the orientation of the PIC has been detected also. Circuit 40 provides the reading ramps, as will be explained with greater detail below, also with reference to FIG. 5. During this "read" or second phase of operation; particular "read" ramps in circuit 40 provide particular deflection signals to the scan control channels 15X and 15Y of deflection circuit 15. A data field of the type depicted in FIG. 2 is scanned by a particular read-scan raster that is oriented parallel to the detected PIC, and will cover an area not much larger than the data field. Each scanning line begins somewhat to the left of the read/start character 115 with retrace occurring not too far to the right of the end of bar 111. The data field is scanned in a plurality of lines until the start/alignment character 115 is no longer detected.

Basically, only two scanning lines are needed: one for upper track 113 and one for lower track 114 of the data field. For reasons of possible read errors, it is desirable to scan the lower tracks in a number of fairly closely spaced scanning lines, to skip the space between the tracks, and to scan the upper track, also in a number of scanning lines. It was found to be of advantage, for example, to scan the lower track in six closely spaced scanning lines, to skip reading for about six scanning lines, and to read the upper track in six scanning lines following the skipping of the inter-track space.

Of course, whenever the reading ramps 40 control the X and Y deflection circuit 15, the output of circuit 14 is deemed to represent the desired read signals (or so one hopes), and these signals are fed to a data decoder 50. The data decoder 50 assembles the read signals, correlates them and determines whether or not the read signals follow the requirements for the code pattern, i.e., whether, in fact, the data signals are representative of characters encoded in a four-out-of-six code, with three bit positions per track in a two track configuration.

Stating the objective of data retrieval differently, data decoding includes checking whether a four-out-of-six bar code is observed in and for each detected six bit character, each character having three aligned bit positions in serial per track arrangement. One can readily see that successful code checking is the ultimate test that a true data field has been detected previously, and not just a bar pattern that happens to look like the chosen PIC.

A circuit 52 may be provided to control repeat of the read operation in case of error. In addition, of course, the decoder 50 does actually decode the data and feeds the decoded data to a data display device 51, or to a different kind of recorder for storage on a magnetic disk, punched tape, etc.

Figure 3:
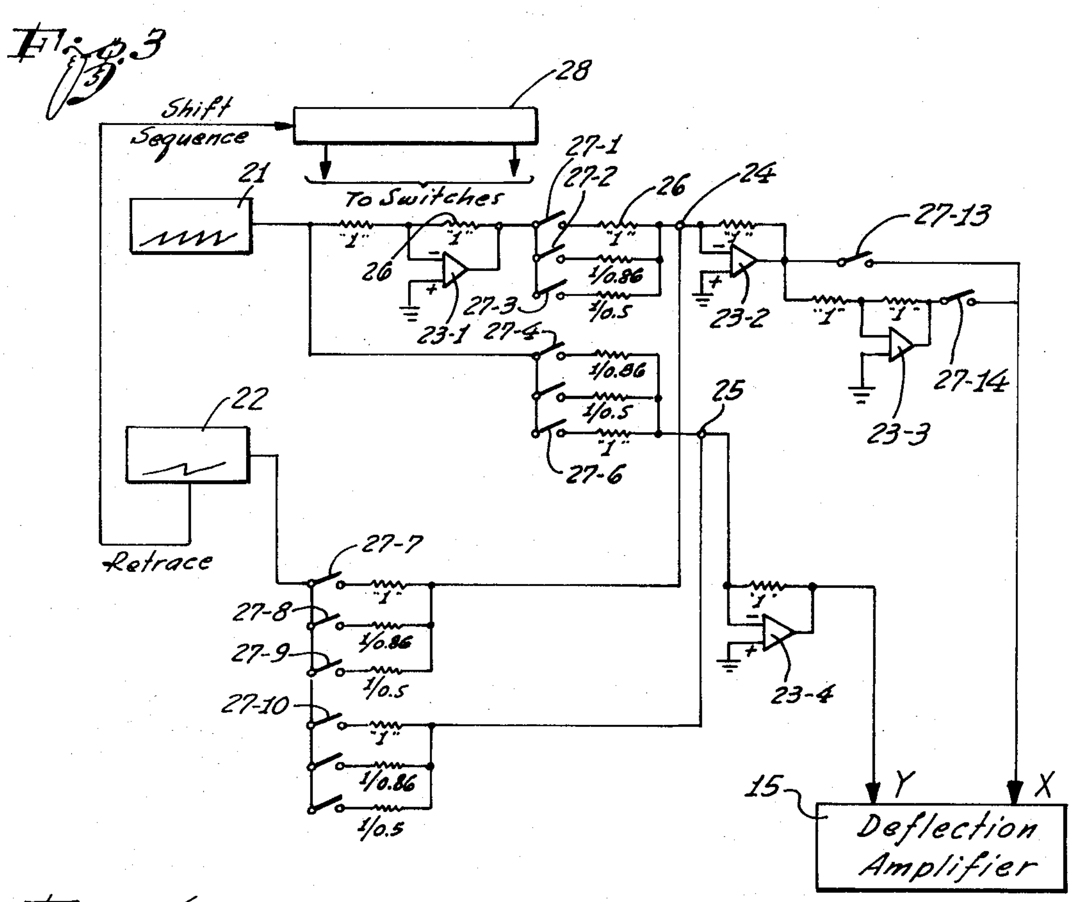

Proceeding now to FIG. 3, the circuit illustrated in this figure particularizes the raster rotation circuit 20. The circuit includes two ramp generators 21 and 22. The ramp generator 21 provides a sawtooth signal of relatively high frequency; the ramp generator 22 provides a sawtooth signal of relatively low frequency. The frequencies may be related, for example, at a ratio of 200:1. If, for example, the ramp generator 21 is copuled to the X deflection input channel 15X of system 15, and if the ramp generator 22 is concurrently connected to the input channel 15Y of system 15, a field scan is obtained wherein the scanning lines run in direction of the X axis as defined by the X deflection system in the flying spot scanner, while the lower frequency ramp signal from generator 22 provides a field or frame scan. The direction of the raster is determined by the orientation of the lines, and one can say that in this particular situation wherein the fast ramp 21 controls the X system and the slow ramp 22 controls the Y system, a line raster is established having angular orientation zero.

The philosophy behind the particular circuit illustrated in FIG. 3 is to provide "weighted" signals from ramp generator 21 to both deflection systems, as a consequence one obtains a particular angular orientation of the scanning lines. Orthoganally weighted signals are derived from the slow ramp 22 and are also fed to the X and Y deflection systems. For a field scan transverse to the chosen direction for the scanning lines.

Proceeding to further details of FIG. 3, there are illustrated several inverting amplifiers 23-1; 23-2; 23-3 and 23-4. These amplifiers are differential amplifiers having their non-inverting input rounded, and their respective inverting inputs receive particular signals. Each of these amplifiers has an output-to-inverting-input-feedback path of a resistor "weighted" unity. If the input resistance to the inverting amplifier input is likewise unity, the amplifier just inverts with unity again. These inverters serve as summing points and/or to perpermit positive and negative directions of scanning as far as this arbitrarily chosen X/Y coordinate system is concerned.

Reference numerals 24 and 25 respectively denote signal terminals for summing point amplifiers 23-2 and 23-4 respectively for the channels 15X and 15Y. The circuit illustrates a plurality of weighted resistances having their relative resistance written in italics next to each resistor. These resistors are collectively denoted with reference numeral 26. The circuit includes a plurality of switches respectively denoted with reference numeral 27-1 through 27-14, which are represented, for example, by FET's and activated, i.e. rendered conductive through operation of a sequencer 28. These switches control insertion or removal of the several input resistors for the amplifiers for control of gain.

The open closed states of these switches determine the application of the outputs of ramp generators 21 and 22 to the X and Y deflection systems with or without weighting. By way of example, the terminal 24 may receive the inverted signal of ramp generator 21, through one or several of the resistance as respectively connectable to the summing point by switches 27-1, 27-2 or 27-3. That summing point 24-23-2 may also receive the output of the ramp generator 22 through similarly weighted resistances; namely, upon closing of one or more of the switches 27-7, 27-8 and 27-9. The situation is analogous as far as summing point 25-23-4 is concerned.

Upon closing switch 27-13, the signal of summing point 24-23-2 is applied to the X deflection input channel 15-X directly. If, in the alternative, switch 27-14 is closed, the inverter 23-3 inverts that signal again so that in effect the summing point signal is applied to channel 15-X in inverted configuration. The amplifier 23-4 always inverts the signal which has been applied to terminal 25 before applying it to the channel 15-Y.

Amplifier 23-1 always inverts the high frequency ramp signal as applied to terminal 24.

It can, therefore, be seen that if, for example, switches 27-1 and 27-14 are closed, the line scan ramp 21 is coupled (via three inversions) to the channel 15-X for control of the X system. If the switch 27-10 is concurrently closed, the slow ramp generator 22 is coupled directly via inverter 23-4 to the channel 15-y so that the slow-ramp or field ramp is effective only in the Y-deflection system. This represents a raster field and scan orientation angle zero.

Through selective opening and closing of the switches 27 by means of the sequencer, slow and fast scan signals can be particularly distributed to the channels 15-X and 15-Y, so that a fast line scan occurs in a particular direction in relation to the X-Y system, and the field scan is then carried out orthogonally to the line scan. The ramp enerator 22 can, in addition, be coupled to the sequencer 28 so that with each retrace or flyback, the sequencer 28 is moved by one step to thereby change the combination of open and closed switches. It is basically arbitrary whether or not the various raster orientations are passed through in a regular sequence.

Figure 4:
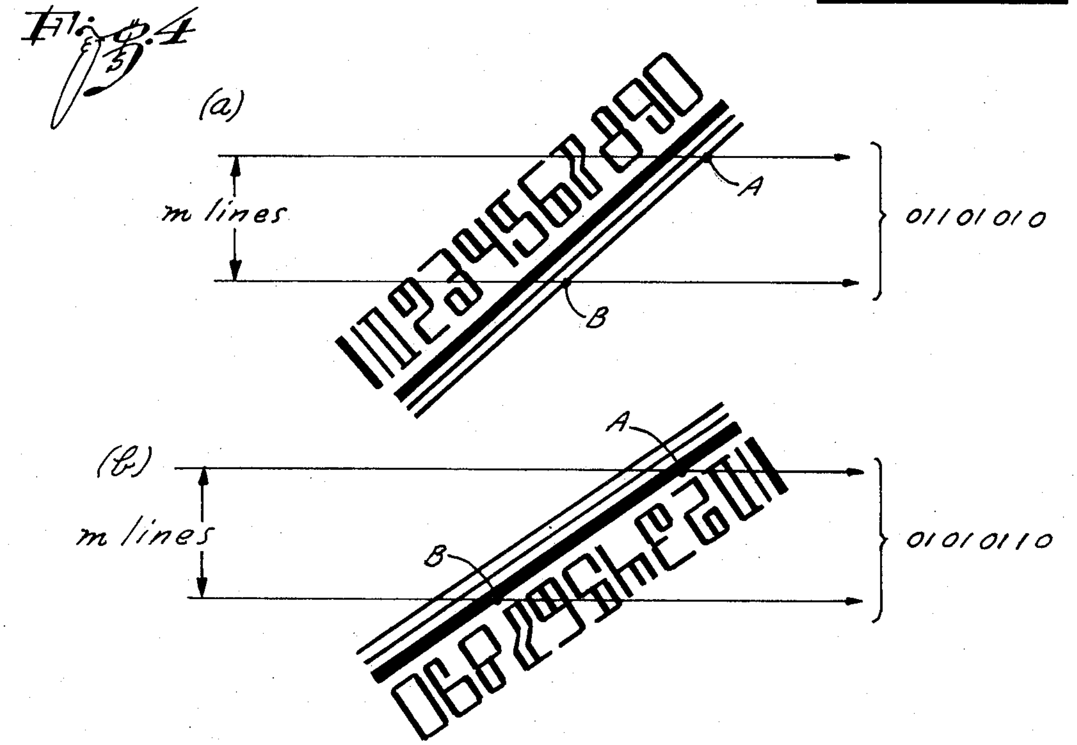

In summary, it is the purpose of the circuit of FIG. 3, as it is effective in the system shown in FIg. 1, to provide a rotating line and field scan raster for searching for a PIC in the search and inspection field. For a PIC to be detected, it is necessary that the scanning line passes across the bars 111 and 112 of a label when in the search field 11, at not too shallow an angle. In the particular example, it is assumed and it was found to be of sufficient accuracy if the scanning line passes across the PIC within a range of ±30° relative to the normal or orthogonal direction to the PIC. FIGS. 4*a* and 4*b* illusrate two examples and actually show approximately the limit situation of oblique scanning for detecting the PIC. In each of these two cases as illustrated, the PIC will be detected. How this is being done will now be explained with reference to FIG. 5, which illustrates the PIC detect circuit 30.

Figure 5:
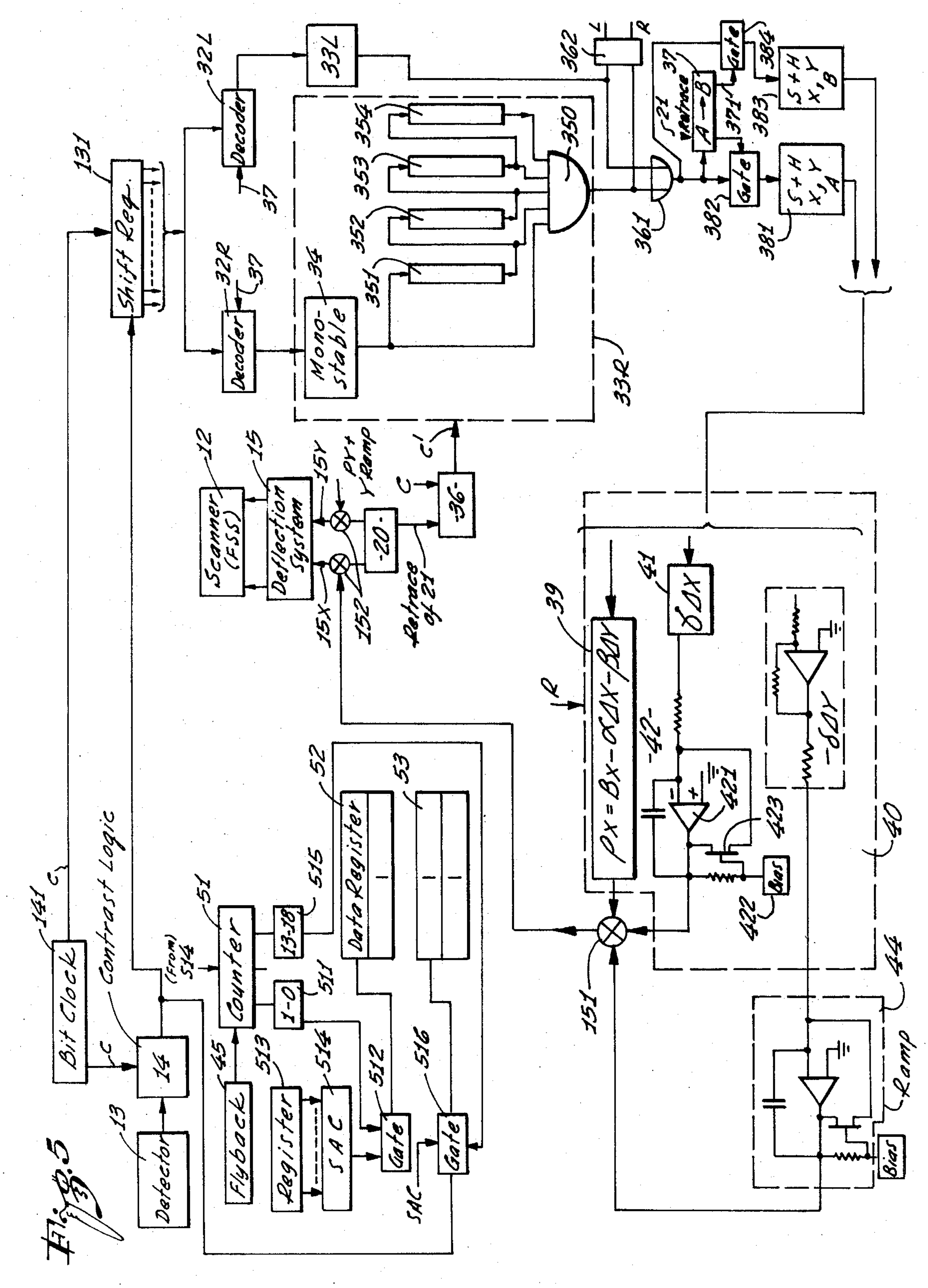

The circuit shown in FIG. 5 includes detector 13 and contrast logic 14 as shown in FIG. 1. The logic 14 converts the variable amplitude of the output of detector 13 into a bilevel, signal, e.g. a low level for brightness reflections above a particular value corresponding to white or light colored or light grey areas; the "high" level results from reflections of darker areas. The circuit 14 serves as digitizer operating at a clock pulse rate determined by a particular clock 141 so that the signal level, high or low, is held at the output of circuit 14 for at least one clock pulse period. Thus, the output of circuit 14 is a train of bivalued bits presented at clock pulse rate and fed into a shift register 131. The register may use the clock 141 as shift clock C.

Looking for a moment at FIGS. 4*a* and 4*b*, it can be seen that in case the scanning spot passes across the PIC in the orientation as illustrated in FIG. 4*a*, a bit pattern 01101010 will appear, in that sequence, and at the input of the shift register; the bits are shifted into the register in the order of appearance. On the other hand, if the data field with PIC is oriented to the scanning lines as shown in FIG. 4*b*, a reverse bit pattern (01010110) will be produced and shifted into the shift register.

A pair of bit pattern decoders is connected to the shift register 131; decoder 32R, for example, responds to a relative orientation of scanning line and data field as shown in FIG. 4*a;* decoder 32L responds to the reverse orientation shown in FIG. 4*b*. The "right hand" and "left hand" orientations are, therefore, treated separately. Thus, decoder 32R includes circuitry to respond to a bit pattern 011010101; decoder 32L includes circuitry to respond to a bit pattern 01010110. The decoder 32R may include additional circuitry to respond to a bit pattern 0011110011001100, which is also representative of passage of the scanning spot across the PIC-pattern, but at a rather shallow angle. Circuitry may be includes in 32L to respond to the inverse of the bit doubled pattern. Using two similar detectors for each orientation, and two separate shift registers, each with a different clock, has the same effect; namely, of detecting the PIC at rather shallow angle passage of the scanning lines across the PIC-lines.

Two circuits 33R and 33L provide idividually for the detection of the PIC orientation. The principle behine the detection is that the PIC-bit pattern must be detected repeatedly on several sequential scanning lines, and not only that, but the PIC patterns must be detected in sequential scanning lines at approximately the same relative point on the lines. These points will not have exactly the same relative location on sequential scanning lines as the PIC is not exactly orthogonally oriented to the scanning lines. Nevertheless, upon detecting the PIC pattern for the first time, circuit 33R and 33L provide for a "window," and during the next line the PIC code must appear again in that window (and again in the next scanning line, etc.). The circuit shown in detail for 33R is designed to require five sequential PIC detections in particular, timed relation before the PIC is preliminarily recognized.

The scanning lines are regarded as digitally quantized in that, for example, the clock 141 is chosen to have a frequency in relation to the fast or line scan ramp (21 in FIG. 3), so that each line is divisible in 102 clock pulse periods, counting from the beginning of a new scan (retrace), but letting the digitizing stop a short distance from the other end of the scanning field. Thus, if the PIC-code has been detected and if the PIC is at or about right angles to the scanning line, the PIC-code should be detected for the second time exactly 102 counted clock pulses later. However, the scanning lines usually have a non-90° angle to PIC-lines, so that the PIC could be detected again after 103 or 101 clock pulses. Presently, it is assumed that the margin is ±2 clock pulses. Of course, this range depends on the "coarseness" of the scanning raster and on how finally the lines have been digitized.

Proceeding now to details of circuit 33R, it must be observed that decoder 32R or 32L will respond to one or the other PIC code for one clock period only. The output signal of the decoder 32R is fed to a monostable multivibrator or pulse stretcher 34, which, in effect, extends the decoder response, for example, to four clock pulses. The output pulse of pulse stretcher 34 is, therefore, a signal of four clock-pulse duration following the detection of a PIC passage. These four bit signals are now applied to and set into a first shift register 351 at clock pulse rate. Upon having detected and decoded the PIC-bit pattern, the signal as now applied to register 351 can be termed a four bit PIC-timing marker. The shift register 351 has, for example, 100 shifting stages under the assumption that a line sweep covers a hundred and two clock pulses. After 100 clock pulses the first bit of the four bit marker has arrived at the end of register 351. after one hundred and two clock pulses, only half of the marker is still in the register, the other two having already left.

The output of the register 351 (i.e. four PIC marker bits) is fed through the input of another shift register 352, whose output is fed to a shift register 353, whose output is in turn, fed to a shift register 354. Each of these shift registers 352, 353, 354, has 102 stages, so that the relative phase between line scanning and marker propagation remains the same after the marker has left the hundred stage register 351.

The entire shift register assembly, which includes the four registers 351 through 354, is clocked through a particular clocking circuit 36, which is a combination of counter and gating structure. Essentially, the gating part of circuit 36 just passes clock pulse C from clock 141 so that the entire circuit runs in synchronism with the principal bit clock of the system. The counting section in circuit 36 just counts up to precisely 102 clock pulses during which period clock pulses C are permitted to pass. Upon detecting the count number 102, clock pulses are no longer permitted to pass until the counter is reset shortly thereafter, and through operation of the flyback signal of the fast ramp 21 in circuit 20.

Thus, circuit 36 provides 102 clock pulses $c'$ for each scanning line, stops and begins again to count out 102 clock pulses for the next scanning line etc. This clock $C'$ runs the shift registers on the intermittent basis as defined. Of course, as long as there is no detection of any PIC, only zeros are being shifted through these serially connected five-shift registers.

It may be assumed that during scanning along a particular line of the raster, the right hand PIC code has been detected and the particular marker, i.e. four sequential "ones," are given off by the multivibrator 34 following the instant of PIC detection. The bits of this four-bit PIC marker are set sequentially into register 351, whereupon the four one-bits propagate as a group through the shift register 351 and the others.

PIC detection, of course, occurs somewhere inbetween the beginning of a line scan and retrace; it will not occur right at the beginning and will not occur very close to the end, because it is, of course, practical to restrict the detection or search area 11 so that, in fact, the fringes of the scanning process are outside of that area. Shifting of the PIC marker stops temporarily when the marker is somewhere in the register 351, but will be resumed when the next scanning line begins. The interruption occurs after circuit 36 has counted 102 clock pulses, and waits for the flyback signal of the fast ramp.

The PIC code is, of course, detected on the next passage, but since a line scan cycle is represented by a sequence of 102 pulse groups and since, however, the register 351 has only 100 stages, there is, in fact, a precession of the first four-bit PIC marker signal. As a consequence, the leading edge of the next response of the PIC detector 32R and of the PIC timing marker produced upon the next PIC passage will not coincide with the leading edge of the preceding four-bit PIC marker, as the latter leaves register 351. Instead, (and assuming presently a 90° orientation between scanning lines and PIC lines) this leading edge of the second PIC-marker will occur when only half of the first PIC-marker is still in register 351; the first two bits thereof have already left the register. The same is true for the next detected PIC-marker signal and for the next PIC-marker signal thereafter. However, the precession is produced only once for each PIC-marker because only register 351 has two stages less than there are bits per line; thereafter each four-bit marker passes from one register to the next one; namely, from 352 and 353 and from 353 to 354 and to the output of 354 in precise phase synchronism with the 102 total clock pulses per line, and the four marker bits recur as a group because each of these registers 352, 353 and 354 has 102 stages.

The reason for the precession is to accommodate inclined positions, positive or negative, of the PIC-lines relative to the scanning lines, because in most instances, the leading edge of a four-bit PIC marker, thus processed, will not appear right in the middle of the four PIC markers which originated during the previous line and as it now leaves register 351, but there will be a slight shift in time in one or in the opposite direction, depending upon the angle of orientation of the PIC lines 111 and 112 in relation to the scanning line in that particular instance.

After four PIC codes have been detected, four four-bit PIC codes are shifted into and through the serially connected registers. The fifth PIC marker occurs with its leading edge in about the middle of all the markers as they appear in the outputs of the registers 351, 352, 353 and 354. These markers are not only set into the respective next register but they are applied also to an AND-gate 350. Coincidence on gate 350 is required to recognize the possibility of detecting a PIC in the search field.

It can, therefore, be seen that an AND-gate 350 will receive a coincidence signal if, in fact, the PIC detector has responded in five sequential scan lines and in particular phase relation as between the five responses. All four-bit PIC markers serve as a window for the detection of the last PIC marker of five sequential PIC detections.

An oblique orientation is assumed in FIG. 4*a*, and five sequential detections of the PIC are regarded as the detection of the point A on the fifth passage. Accordingly, an OR-gate 361 receives a PIC recognition signal, and a flip-flop 362 is placed into a state which is indicative of discovery of a right-hand orientation of the data field in the inspection area. This distinction is important for the operations carried out subsequently.

A scanning line counter 37 is now enabled and placed, e.g., into count state 1 by or after this first PIC recognition pulse from gates 350–361. The counter responds to the flyback signals or reset or retrace of fast ramp 21 and counts them after point A has been detected. It will be appreciated that upon continued scanning in accordance with a particularly oriented raster, the AND-gate 350 could respond anew after each line because the scanning lines, pursuant to the field scan, continue to traverse in the PIC. Therefore, with each detection of the particular PIC code, a PIC recognition signal could be produced. However, this repeated redundancy is not necessary to verify detection of a PIC. Therefore, the counter is coupled, e.g., to the detectors 22 and disables them until, e.g., *m* scanning lines have been counted.

Upon having counted up to *m* lines, the PIC detection circuit is again enabled, and if the PIC (as it must be) is still in the scanning field, the detection will be repeated. During counting, registers 351, etc., were cleared, all markers were shifted out of the register assembly. Upon completion of counting, the operation of the registers will be repeated, and after 5 more scanning lines, gate 350 will respond again and issue a signal which is indicative and representative of the detection of point B upon suitably selecting the number *m*. Point B can be "placed" quite close to the end of the PIC.

It can be readily seen that detection and recognition of PIC point B is made contingent upon detecting the PIC twice, and the two detections must occur in a particular timed-spaced relation to each other. This organized redundancy makes it quite improbable that a pattern different from the desired one is detected and recognized as a PIC.

It will be particularly appreciated that any response of AND-gate 350 to the leading edge of the last one of five sequential PIC detections is indicative in time, as well as in space of the coordinates of a point on the bottom one of the PIC lines as so detected. The two responses of the AND-gate 350 as so considered, mark the detection of the points A and B as indicated, and the deflection signals provided to channels 15-X and 15-Y in the instants of response of gate 350 determine, in fact the X/Y coordinate for these points within the scanning and raster system.

Reference numeral 381 denotes collectively two sample-and-hold circuits; one for the X coordinate and one for the Y coordinate of the scanning system. The sample-and-hold circuits 381, therefore, do respond to the first PIC detection signal as derived through the AND-gate 350 and sample and hold the X and Y coordinates for the point A. A gate 382 is kept open but closes upon the first detection so that only the point A is detected, and subsequent responses of the AND-gate 350 do not cause the sample-and-hold circuits 381 to respond anew.

Analogously, the signal in line 371 occurs in the instant the scanning beam passes over and has, in fact, now located point B. That signal serves as gating signal for a gate 384 leading to a second pair of sample-and-hold circuits 383. These sample-and-hold circuits 383 are likewise connected to the channels 15-X and 15-Y, and they sample and hold respectively the X and Y coordinates of point B, when gate 350 responds for the second time.

After these points A and B have been detected, the combined search and PIC and data field locating phase is terminated. The response of the counter 37, for example, can be used to provide a signal to the phase circuit 17 in FIG. 1 to change the operational phase in the system. It now is important to consider that the system has not just detected the presence of a PIC in the search field, but that it has also detected the two points A and B on that PIC. The fact that the point B could be detected at all and was, in fact, detected, is the most important, criterium that a true PIC has been detected and that the successful PIC pattern decoding, which lead to the detection of point A was not an accident.

The sampled and held values of the coordinates of points A and B in conjunction with the fact that circuits 32R–33R (and not 33L – 34L) responded indicate unambiguously the angular orientation of the data field and the direction of the data tracks. The response of decoder 32R establishes the fact that the second point detected, called point B, is rather close to the beginning of the data field. If, on the other hand, the decoder 32L had responded, point B would be rather remote from the data track (see FIG. 4*b*). In this case, S + H circuits 381 and 383 are exchanged as far as further use of their outputs is concerned. Thus, the left-right control flip-flop 362 controls whether circuits 381 and 383 are used in the stated order or reversed. In the following, the right hand orientation will be described, the left hand case simply follows by using the output of 383 for 381 and vice versa.

The circuit to be described next serves as a set-up for a data line scan raster uniquely associated with the data field whose position and orientation have been detected. The scanning pattern is changed from the search scan in a two-step process to be described next. In the first step, a starting or anchor point for this data scan raster is generated; in the second step the raster itself is generated.

Figure 6:
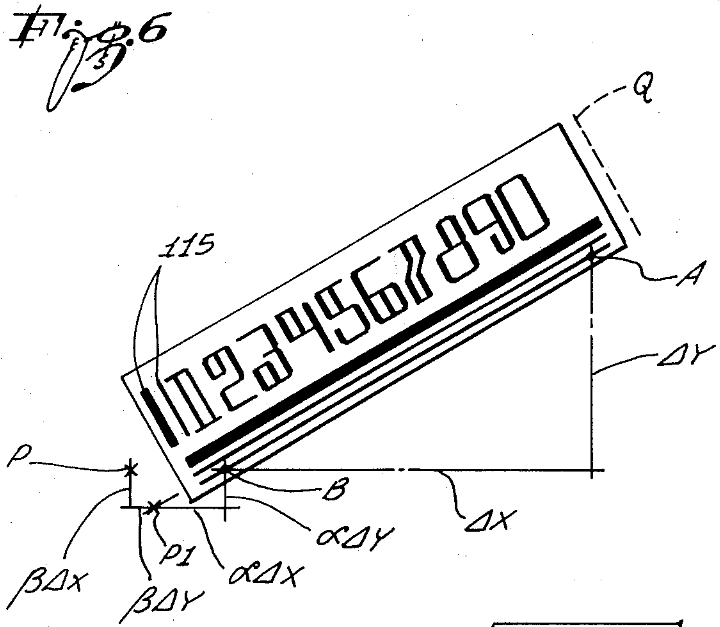

Turning now briefly to FIG. 6, the point P is regarded as a starting point for the data scanning process. The point is located slightly above the bar 111 and to the left of the start/alignment character 115, and, therefore, has a particular location relative to the points A and B. Point P can be located outside of the label as will be understood shortly.

The point P can be defined as follows: an auxiliary point P1 is established in that the point P 1 is on a line as running through points A and B but at a fraction of the distance between points A and B, and to the left of point B. If the differences in coordinates of points A and B are designated $\Delta X$ and $\Delta Y$, then the point P 1 has coordinates which can be derived from the XY coordinates of point B, minus the particular fractions of $\Delta X$ and $\Delta Y$. In the drawings, the fraction is indicated by a gain factor $\alpha$ which is smaller than unity.

The point is located on a normal or orthogonal line through P 1 and at right angles to the line A, B, P 1. Thus, the coordinates of point P can be derived from the coordinates of point P 1 through adding a particular fraction of $\Delta X$ to the Y coordinate of point P 1, and subtracting the same proportional fraction of $\Delta Y$ from the X coordinate of point P 1. The fraction is expressed as a gain factor $\beta$, also smaller than unity and, possibly, but not necessarily, smaller than $\alpha$.

The circuit 39 in FIG. 5 representatively shows a network used to generate the X coordinate of the point P. It can readily be seen that this generation is carried out through isolating and operational amplifiers, for example, of particular gain. The network 39 sums, therefore, the several signals and establishes a new signal which is the X coordinate for the point P. The first signal BX is directly derived from that portion of sample-and-hold circuit 383 which holds the X value for the point B (the signal is taken from 381 in case of a left-hand PIC detection). Subtracted therefrom is a signal $\alpha\Delta X$, which can be produced through feeding the X coordinate of points A and B to opposite inputs, i.e., to oppositely poled inputs of a differential amplifier having an overall gain which is smaller than one; namely, a gain that is equal to $\alpha<1$. $\alpha$ may be, for example, one-tenth or thereabouts. It can be seen that the X coordinate of point B from which is subtracted a value of $\beta\Delta X$, leads to the X coordinate of auxiliary point P 1.

In order to establish the X coordinate of the point P, another fraction of $\Delta Y$ must be subtracted because of the orthogonal relationship defined above. $\Delta Y$, of course, is established through suitable operational amplifiers coupled to the sample-and-hold circuits for the Y coordinates of points A and B respectively in circuits 381 and 383. Through suitable selection of resistances, a gain factor $\beta$ is established, also being smaller than unity. Adding (negatively) these values together, does, in fact, lead to the signal PX representing the X coordinate of the point P.

It can readily be seen that the Y coordinate of the point P is established analogously, namely, through the relation $PY = BY - \alpha\Delta Y + \beta\Delta X$. Feeding the signal PX to the summing circuit 151 and introducing that signal to a further summing circuit 152 controls the X deflection system in circuit 15, to home the scanning beam to the X coordinate of the point P. Of course, concurrently the signal PY is fed to the Y deflection channel 15-Y, so that the scanning point locates, in fact, on point P.

Point P, as stated, is the starting point for the data scanning process. The data scanning process is carried out in a manner to be described next. Looking briefly again at FIG. 6, the point P, is a starting point from which to start a fast line scan as well as a relatively slow field scan process which scanning process covers only about the data field and in unique orientation relative thereto. It is an important aspect of the invention, that the scanning pattern covering a relatively large area and on a coarse scale, is now being replaced by a raster scan that covers only about the data field and is oriented to match the random orientation of the data field.

The first scanning line will be started at point P and will run parallel to the PIC approximately up to the line Q, whereupon the fast ramp will retrace to traverse the next line, etc., and as many lines as needed are produced with orthogonal shift of the scanning lines pursuant to a field scan until the data has been read. In essence, therefore, we turn now to the description of details of the reading ramp generating circuit 40 of FIG. 1.

A first ramp is generated by ramp generator 42, having a differential high gain amplifier 421 with integrating feedback to which is applied a signal that can be described as $\gamma\Delta X$. A circuit 41 receives the X coordinates of points A and B and forms $\Delta X = X_A - X_B$, multiplied by a gain factor $\gamma>1$ which represents the fact that the distance from point P to a point on line Q, when projected onto the X coordinate, is larger than $\Delta X$. In reality, choice of this factor $\gamma$ establishes line Q.

The ramp generator 42 will now produce an output that rises at a slope which is proportionate to $\gamma\Delta X$. A FET 423 has its gate suitably biased and is enabled in that momer to monitor when the ramp has actually reached the peak amplitude equal to $\gamma\Delta X$, whereupon input and output are short-circuited, the feedback capacitor discharges and the ramp is reset to zero. The ramp is applied to summing point 151 and is superimposed upon X deflection signal PX, so that a line scan signal component in the X direction is produced, to begin at point P with reset at a point on line Q, back to P.

The ramp generator 421 (and the analogous one that operates the Y deflection system for a composite, fast line scan along the data tracks) can be reset in dependence upon a time delay and/or pulse count signal rather than amplitude dependent as described. The amplifier 41 is not needed in this case and the proportionality of the sweep slope to $\Delta X$ will then be controlled only by the RC circuit of the ramp generator as connected to receive $\Delta X$.

A ramp generator 44 is similarly constructed to circuit 42 but receives a signal $-\delta\Delta Y$ and provides a slow sweep signal to the summing point 151 so as to obtain concurrently the X component for a slow, field scan orthogonal to the line scan. The slow field scan shifts the point of retrace trigger along line Q, and the starting point is shifted on a line through P parallel to Q (i.e., orthogonally to the PIC lines 111–112).

There is, of course, an analogous circuit for the Y deflection system. The Y deflection signal is composed of a fast ramp operating proportional in slope to $\alpha\Delta Y$ and running up to a peak of like value (or being reset by a timing signal together with the fast x-ramp). A slow ramp signal proportionally to $\delta\Delta X$ is superimposed to obtain the Y component for the field scan; resetting of that slow ramp occurs analogous to resetting of the *x*-component of the slow scan.

It can thus be seen that by operation of the circuit as described, the data field will be line-scanned and in proper direction along the tracks; a field scan is provided in the direction of the short dimension of the label. Thus, a "private" line raster scanning field is established for the data field. However, the circuit requires certain refinements because not all read signals gained during the data field scan can be regarded as having validity as data. As can be seen, for example, from FIGS. 2 to 6, the point P is selected so that the first line sweeps below the lowest track in the data field so that proper data will not result from the first reading line. If the data field scan were to start at point P 1, the situation is more pronounced. Thus, it must be expected that the first few or several data scanning lines do not yield valid data signals.

Furthermore, and as stated above, there are also portions in the data field below and above the first track which do not contain markings which are meaningful for machine reading; they render the characters legible to people. The same is true immediately above the upper track.

The process of extracting any true data from the read signals during a data field scan, and the exclusion of unwanted signals, will be developed in several steps. First, it will be considered that the lower track (114) can be covered, for example, by about six scanning lines, that the middle area between tracks 113 and 114 can be safely excluded through about six scanning lines, and that the next following six scanning lines will then cover the upper track 113. Additionally, label areas to the left and to the right of the data on these eighteen scanning lines are excluded. The exclusion of label areas above and below the eighteen lines will then be discussed as the final step. Of course, the implementation is or can be interrelated, and the discussion of a step-like process merely facilitates understanding.

Turning now to the portion of FIG. 5 shown in the upper left corner, one can see the following: A circuit 45 is, for example, coupled to the FET 423, or it is coupled to a combined circuit which includes this particular FET 423 and which includes also the corresponding FET for the fast Y reading ramp, to respond to read scan line flyback. The flyback signal is a pulse which is set into a counter 51. A first decoder 511 responds to count numbers 1 through 6, and thereby provides a gating signal which is, therefore, true for six lines of read scanning. The data train as extracted from circuit 14 is fed to a gate 512 which is opened for the first six line scans; the resulting data is fed to a data register 52.

However, it must now be taken into account that the read scan begins outside of the data field. Thus, it is required to make the data storage dependent upon the detection of the start/alignment character 115. The data signals from circuit 14 are, therefore, fed, in addition, to and through a register 513, shortly after the beginning of each read scan. The start/alignment character 115 (SAC) must be detected before signals are recognized as true data. The start/alignment character is decoded by means of a detection circuit 514 coupled to the several stages of register 513 and providing an additional gating signal to the gate 512 so that the register 52 will receive data only after the scanning has been passed over the start/alignment character.

The SAC circuit 514 may be set by the detected start-/alignment character and reset on the next flyback to maintain the gating-on signal for the remainder of the particular line sweep. It can be seen that, in fact, this particular operation is another verification of a true label and data field detection; if the read scan finds that a start/alignment character is not there, data will not be read and the lines which are determined to have been recognized as a PIC were an accidentally similar contrast pattern.

The SAC detector (514) can be understood as a simplified version of a more detailed SAC detect and verification circuit that is constructed analogously to circuit 33R. Thus, circuit 514 may include a SAC detector proper, responding, for example, to the bit pattern 0110010, and a plurality of serial shift registers receive a detector output. This SAC detect marker is shifted through the shift registers. Upon repeatedly scanning across the SAC lines, a corresponding number of such SAC detect markers are set into the shift registers but at a phase difference equal to the number of clock pulses that represents the length of a scanning line on the data field as scanned. After, e.g., three responses of the detector proper to the SAC-lines, two detector markers must have particular position in the plural shift registers and a third such marker is just about being shifted into the registers. A coincidence circuit (analogous to gate 350) responds, and that response is regarded as verified SAC detection under threefold redundancy. A flip-flop is set by this response (and reset upon retrace) to open gate 512 as described.

The threefold redundancy of SAC detection may, but does not have to be, repeated for each subsequent SAC detection on each scanning line. Actually it is not advisable to make the reading of data depending upon detection of three sequential passages across the SAC-lines for each read scan line as, for example, a defect in the otherwise correct SAC may interrupt the read process. Thus, after, e.g., three sequential passages have been detected, the subsequent reading is made dependent upon single SAC detection for each line as read-scanned.

The data reception circuit is enabled only for the duration of sweeps from line one to six (beginning with SAC detection). The data circuit is disabled during the sweep of lines 7 through 12, so that data are not being received; gate 512 has closed on count 7 of counter 51. The circuit 515 responds to a count state 13 through 18 of counter 51 and provides a gating signal during sweeping of 13 through 18 lines to a gate 516. Gate 516 requires also the SAC detection signal for each read scan line, and now the upper track portion is read. The read data are set into a register 53, again also in a six-fold redundancy.

It is optional to the equipment to require that the data must be identical in each of the six sweeps; the majority rule may be used here. It can also be seen that the start/alignment character 115 is quite important because it permits correlation of the content of registers 52 and 53 for subsequent character assembly. The registers 52 and 53 are shown as stacks, with, possibly, parallel push-down on each flyback.

Up to this point I considered utilizing eighteen scanning lines for data scanning. Actually, one cannot use the first 18 scanning lines unless the starting point P is clearly on and in line with lower track 114. As that is impractical, the counting of scanning lines in counter 51 may be made dependent on SAC detection by circuit 514.

Utilization of a start/alignment character permits also the following related smplification. The synthesis of point P as a data scan starting point above the PIC lines is not necessary in principle--the read scan may start from point P1. Thus, the circuit 39 does not need the component proportional to $\beta$. $\Delta Y$ and thus produces only P 1 $X = BX - \alpha\Delta X$. Therefore, the SAC lines 115 should extend somewhat below the foot level of the data characters. The first SAC detection occurs on a scanning line in or even underneath the foot level of the characters; the second SAC detection occurs on a scanning line passing through the horizontal connecting bars in the foot level of most of the characters. The third line scans data for the first time. The start alignment character will not be detected during the first few data scan lines because the scanning spot will pass longitudinally across the PIC at first; the white space underneath the data, above the PIC, will be covered by one or a few scanning lines, and thereafter the S/A character will be detected. Of course, data field scanning will be somewhat slower under these conditions when beginning at P 1 than at P.

It can readily be seen that the circuitry for the left-hand oriented data field (FIG. 4*b*) operates quite analogously. However, the read ramp starting point is generated with reference to the PIC point detected first, point A, and the polarity of $\Delta X$ and $\Delta Y$ must be reversed. Or, as stated above, circuits 381 and 383 are coupled to circuit 40 in the inverse order amounting to an exchange of A and B.

It will also be appreciated that the distinction of left and right orientation is made only for purposes of speed. In case the scanning raster for searching is rotated over 360° in 60° steps, no such distinction needs to be made. The raster rotation (FIG. 3) will require additional inverters as the reversion of scanning is equivalent to a 180° rotational angle added to the existing one.

Figure 7:
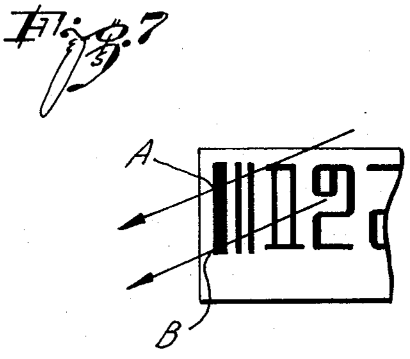

The example of the data field shown in FIG. 7 illustrates how the respective function of the start/alignment character and of the PIC can be combined by providing an asymmetric linear PIC, transverse to the direction of extension of the data field label and data tracks, and the specific location in which the start-/alignment is provided in the other examples. One can readily see that detection of points A and B is quite analogous to the detection of points A and B as described above in reference to the data label of FIG. 2 and FIG. 3, except that, of course, the number of scanning lines available here for redundancy scanning and for detecting spaced-apart points A and B is smaller. Naturally, the accuracy of detection, or the likelihood of detecting an erroneous PIC, is increased. Moreover, if for example four or more parallel data tracks are used, this combined SAC-PIC pattern will be quite long. The utilization of this kind of a PIC will, therefore, to some extent, depend upon the environment in which the data field is used. Nevertheless, basically the same circuit as shown in FIGS. 1, 3 and 6, can be used with some simplification.

It can be seen from FIG. 7 that, for example, the point B can be used directly as the starting point P for the scanning process. Also, it must be realized that the values ΔX and ΔY as determined by means of the circuit as illustrated, must be orthogonally transformed for the line and field scan process as compared with the mode of using ΔX and ΔY in the circuit shown in FIG. 5. This means that driving signals for fast and slow reading ramp generators are exchanged. Otherwise, the same type of operation is involved; namely, that the coordinate values of ΔX and ΔY are used to define the direction for scanning the data field for reading the data tracks thereon.

Figure 8:
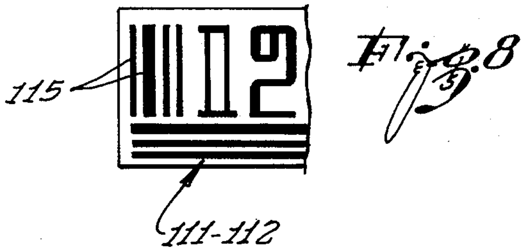

It should be mentioned that horizontal PIC (FIG. 2) and vertical PIC (FIG. 7) can be combined, which amounts to an increase in distinctive detail for the S/A character; whereby, however, the two line patterns must still be different. This is depicted in FIG. 8, showing the horizontal PIC line pattern 111-112 as before, together with modified pattern 115 of vertical lines. It can be seen that four different PIC codes may result here, two for each PIC, and the two foe each PIC are respectively inverse in time sequence because of two possible directions of scanning across the respective PIC. (See desciption above on left and right hand distinction). These form possible PIC signals, are separately decoded, and lead to four different ways of arriving at a starting point for the data scanning line and field raster. A rotational scanning field for searching as shown in FIG. 3 is not necessary, but the circuitry of FIG. 5 as far as PIC detection and starting point generation is concerned has to be duplicated to meet the two additional cases resulting from the employment of a second PIC. Of course, the vertical PIC will serve also here as start/alignment character; the decode circuitry of block 514 will be constructed accordingly (or could be shared to serve as left-hand vertical PIC detector in the search phase).

It can be seen that under these conditions each PIC detection operates in a ±45° angular range. It is advisable to narrow that range as it requires that a rather wide margin for bit cell variations be accommodated. A remedy here is the employment of distributing PIC pattern detection circuitry, for detecting also doubled bit patterns as was outlined above. Alternatively, each possible and permissible PIC pattern is detected by two similarly designed detectors and register (corresponding to register (131) is duplicated also; the second one being run at half the regular clock rate.

Detection of both PIC's could be made mandatory in order to improve certainity of detection. Accordingly, once one PIC has been detected, fast and slow search ramps (21, 22 in FIG. 3) should be exchanged on the 15X – 15Y inputs corresponding to a 90° rotation for purposes of verification. Under such circumstances, both PIC's will be detected always (if, in fact, they are present). Therefore, the synthesis of P 1 can always be carried out, e.g., on the basis of the horizontal PIC points as detected. Also, the relevant signals ΔX and ΔY need to be generated and derived from that one PIC only. It follows that the circuit of FIG. 5 need only to be supplemented by additional PIC detections responding to the second line pattern (possibly using detector 514 as part of the PIC detection circuitry for shared operation in the data field search phase). The sample-and-hold circuits 381 and 383 are used for defining points on one PIC only, and the read phase proceeds as described.

A vidicon tube can be used in all of the embodiments above, replacing the flying spot scanner and the detector, subject to the additional requirement that the target is periodically scanned in its entirety to ensure constant sensitivity. For example, the target of the tube is scanned by a coarse line raster (relatively few lines) using a defocussed beam of higher intensity, so that the target is covered completely, and in a short period of time, through a line raster having a large low revolution but a high intensity spot.

The invention is not limited to the embodiments described above; all changes and modifications thereof not constituting departures from the spirit and scope of the invention are intended to be included.

I claim:

1. The method of identifying objects by means of data information, which objects may appear in random position and orientation and at random times in a particular area, comprising:
- providing a data field on a surface of the objects which data field is comprised of contrasting data markings arranged in at least one track;
- providing to the data field a contrasting line pattern identifying location and orientation of the track in the data field, the pattern including plural lines extending in a first direction, and being spaced in a direction normal to the first direction;
- line scanning the particular area in a scanning field for detecting repeatedly a particular signal pattern as resulting from line scanning the particular area when containing a data field with line pattern therein, and when line scanned transverse to the first direction and within an angular range about the said normal direction;
- determining the data field portion and orientation as a result of said line scanning when detecting repeatedly said particular signal pattern; and
- providing a unique data field scanning pattern on basis of said position and orientation determination for causing said data track to be scanned repeatedly in direction of its extension for reading the data contained in the data field.

2. The method as in claim 1, wherein the line scanning is carried out sequentially in different directions to obtain a relatively steep angle of passage of the lines of the scan across the contrasting line patterns.

3. The method as in claim 1, wherein the data field scanning pattern is substantially confined to the data field with field scan transverse to the data track.

4. The method as in claim 1, wherein the line pattern is placed along the data field, the data field orientation determination step including detecting particular points on the line pattern, the data field scanning pattern established as line scanning operation along the line pattern with field scanning occurring transversely thereto.

5. The method as in claim 4, including providing a unique start/alignment character at one end of the data field extending transversely to the data track, and controlling data reading in response to detection to said character during the data field scan.

6. The method as in claim 1, the determining step including the detection of two particularly spaced points on the line pattern, the unique data field scanning pattern being determined in relation to the direction as defined by the two points, defining the direction of needed line scan along the data track for data readout.

7. The method as in claim 1, the determining step including discriminating between opposite directions of line scan across the line pattern on basis of inverted signal patterns.

8. Apparatus for the reading of information in a particular area, comprising:

first means for establishing a scanning raster by means of line and field scan respectively in two orthogonal directions and including means for rotating the scanning field to obtain different directions of line scan in the area;

second means responsive to a particularly repetitive signal pattern as indication of a particularly oriented data field;

third means connected to the second means to derive therefrom a plurality of control signals representing a pair of orthogonal directions directly indicating the orientation of the data field;

a plurality of ramp signal generators connected to the third means to be responsive to said control signals to obtain a line field scan of the data field in the said orthogonal direction for read-scanning essentially the area of the data field only; and means connected to produce data signals in response to the read scan operation as carried out by operation of the plural ramp generators.

9. Apparatus as in claim 8, wherein the data field is identified by a plurality of differently spaced and/or differently thick lines, there being data markings on one side of the lines the particular point being located on the other side of the lines; and means for detecting said asymmetrical signal pattern during the read-scanning for controlling the production of data signals in response to said detecting.

10. Apparatus as in claim 8, wherein the data field is identified by a plurality of differently spaced and/or differently thick lines;

the third means including first circuit means for detecting a first point on said line pattern;

second circuit means for detecting a second point on said line pattern;

and third circuit means connected to the first and second circuit means for generating difference signals representing the relative orientation of said line patterns, said difference signals being included in said control signals.

11. Apparatus as in claim 8, wherein the data field is identified by a plurality of differently spaced and/or differently thick lines extending in one of said orthogonal directions, the second means including shift register means and a coincidence circuit, the shift register receiving signal upon each detection of a signal pattern resulting from scanning across the plurality of lines, the coincidence circuit connected to monitor of presence of plural such signals in specified positions in said shift register means to recognize the line pattern.

12. Apparatus as in claim 11, the third means including first circuit means connected to be responsive to signal indications representing particular points on and along the lines, and second circuit means forming difference signals from said signal indications; and third circuit means for particularly processing said difference signals to generate signals that cause the ramp signals to scan from and to particular points relative to the data field.

13. Apparatus as in claim 8, the third means including first circuit means connected to provide signals representing particular coordinate points in the scanning field and on the data field, the third means including second circuit means forming difference signals from said coordinate representing signals to obtain the control signals.

14. The method of identifying objects by means of data information, which objects may appear in random position and orientation and at random times in a particular area, comprising:

providing a data field onto a surface of the objects which data field is comprised of contrasting data markings arranged in at least one track;

providing to the data field a contrasting line pattern having plural, spaced apart lines wherein the direction of extension of the lines of the pattern have predetermined relation to the angular orientation of the track in the data field;

scanning the particular area by means of a line raster scanning field for detecting repeatedly a particular signal pattern as resulting from scanning across said line pattern in adjacent scanning lines;

detecting the particular signal pattern repeatedly and generating signal representation indicative of a plurality of points on and along the line pattern;

processing said signal representation to obtain second signal representation for the generation of a scanning raster for line scanning along said track and for field scanning orthogonally thereto;

generating a representation for starting scanning raster on basis of said point representation; and providing for the raster scan on basis of the second signal representation and said starting representation to obtain a data read scan and data read out of the data field.

15. The method as in claim 14, wherein the scanning of the particular size is carried out by several raster scanning fields in which the raster lines have different directions.

16. The method as in claim 14, and including the step of providing a second line pattern in a particular angular orientation to the first line pattern.

17. The method as in claim 16, the first and second line patterns have different orientation and differ in line thickness and/or line spacing and/or number of lines.

18. The method as in claim 17, wherein first or second signal patterns are detected depicting scanning across the first or the second line pattern, and wherein the subsequent operations differ.

19. The method as in claim 18, wherein the second line pattern is detected for verifying subsequently retrieved information as data during said data read scan.

20. The method as in claim 18, wherein the second signal pattern when detected repeatedly is used to generate representaion of a second plurality of points along the second pattern, the processing step proceeding in the alternative for providing said second signal representation on basis of the representaion of the second plurality of points.

21. The method as in claim 12, wherein the first line pattern is placed along the data track, the second line pattern is placed transverse thereto and at one end of the data track.

22. The method as in claim 12 wherein line thickness and/or line spacing of at least one said patterns is asymmetric.

23. The method as in claim 14, wherein the line pattern is asymmetric in line spacing and/or line thickness and the detecting step includes detection of the asymmetry of the line pattern on basis of the direction of scanning, the starting representation being generated on basis of the directional distinction.

24. The method as in claim 14, wherein the detecting step includes detection of an extended signal pattern upon scanning across said line pattern at a relatively shallow angle.

25. Apparatus for the reading of information in a particular area, comprising first means for establishing a scanning raster by means of line and field scan respectively in two orthogonal directions, wherein each line is established by progressing phases of a scanning spot;

second means responsive to a particular signal pattern when occurring during scanning by means of said raster;

third means connected to establish signal representation of the relative phase of scanning as progressing along a scanning line and separately for sequential ones of the scanning lines;

fourth means connected to the second and third means and responsive to repeated detection of the particular signal pattern by the second means in sequential scanning lines and within a particular phase range for some of said latter scanning lines, the phase range being determined in relation to the phase of detection of the particular signal pattern as determined by the third means and for a first-one-in-time of said sequential scanning lines; and fifth means connected to obtain read out of the data field in dependence upon successful repeated detection of said particular signal pattern by the second and third means.

26. Apparatus as in claim 25, wherein the fifth means includes first circuit means connected to the fourth means for generating control signals representing the direction of extension of the lines of the line pattern as detected; and second circuit means connected to operate in repsonse to the control signal for generating a data reading scan with scanning lines extending in a particular direction in relation to the direction of extension of the lines of the line pattern.

27. Apparatus as in claim 25, wherein the scanning lines of a data reading scan are controlled to extend transversely to the direction of extention of the lines of the line pattern as determined by the first circuit means, and circuit means connected to render data reading dependent upon additional detection of the particular signal pattern during a scanning line of the data reading scan.

28. The method of identifying objects by means of data information, which objects may appear in random position and orientation and at random times in a particular area, comprising:

providing a data field on a surface of the objects which data field is comprised of contrasting data markings arranged in at least one track;

providing to the data field a contrasting line pattern identifying location and orientation of the track in the data field, the pattern including plural lines extending transversely to the said track and being spaced in a direction parallel to the said track;

line scanning the particular area in a scanning field for detecting repeatedly a particular signal pattern as resulting from line scanning the particular area when containing a data field with line pattern therein, and when line scanned transverse to said lines and within an angular range about the said direction parallel to said track;

determining the data field position and orientation as a result of said line scanning when detecting repeatedly said particular signal pattern; and providing a unique data field scanning pattern on the basis of said position and orientation determination for causing said data track to be scanned repeatedly in the direction of its extension for reading the data contained in the data field.

29. The method as in claim 28, and including detecting the particular signal pattern repeatedly during scanning by means of said unique scanning pattern, to control the reading of the data in dependence upon the detection of said signal pattern.

30. The method as in claim 28, and wherein the data markings are being placed to one said line pattern and extend therefrom along the said track.

31. The method as in claim 30, the determining step including determining a starting point for said unique scanning pattern, so that the starting point is located at the opposite side of said line pattern in relation to the disposition of the data markings.

32. The method of identifying objects by means of data information, which objects may appear in random position and orientation and at random times in a particular area, comprising:

providing a data field onto a surface of the objects which data field is comprised of contrasting data markings arranged in at least one track;

Providing to the data field a contrasting line pattern having plural, spaced apart lines, wherein the direction of extension of the lines of the pattern have determined relation to the angular orientation of the track in the data field;

scanning the particular area by means of a line raster scanning field for detecting repeatedly a particular signal pattern as resulting from scanning across said line pattern in adjacent scanning lines;

detecting the particular signal pattern repeatedly and generating signal representation indicative of a plurality of points on and along the line pattern;

processing said signal representation to obtain second signal representation for the generation of a scanning raster for line scanning along said track and for field scanning orthogonally thereto;

generating a representation for starting the scanning raster on basis of said point representation; and providing for the raster scan on the basis of the second signal representation and said starting representation to obtain a data read scan and data read out of the data field.

* * * * *